US011515796B2

(12) United States Patent
Mazgut

(10) Patent No.: US 11,515,796 B2
(45) Date of Patent: Nov. 29, 2022

(54) CURRENT BALANCING FOR INTERLEAVED POWER CONVERTERS

(71) Applicant: SEMICONDUCTOR COMPONENTS INDUSTRIES, LLC, Phoenix, AZ (US)

(72) Inventor: Roman Mazgut, Zilina (SK)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 23 days.

(21) Appl. No.: 17/301,393

(22) Filed: Apr. 1, 2021

(65) Prior Publication Data

US 2022/0060121 A1 Feb. 24, 2022

Related U.S. Application Data

(60) Provisional application No. 62/706,497, filed on Aug. 20, 2020.

(51) Int. Cl.
*H02M 3/335* (2006.01)
*H02M 3/28* (2006.01)
*H02M 3/00* (2006.01)

(52) U.S. Cl.
CPC ............ *H02M 3/285* (2013.01); *H02M 3/01* (2021.05); *H02M 3/33592* (2013.01); *H02M 3/33571* (2021.05)

(58) Field of Classification Search
CPC .... H02M 3/01; H02M 3/335; H02M 3/33571; H02M 3/33592
See application file for complete search history.

(56) References Cited

U.S. PATENT DOCUMENTS

| 10,491,123 | B2 * | 11/2019 | Wang | H02M 3/33592 |
| 11,018,589 | B1 * | 5/2021 | Huang | H02M 7/08 |
| 2008/0123374 | A1 * | 5/2008 | Vinciarelli | H02M 7/10 363/65 |
| 2018/0342958 | A1 * | 11/2018 | Ji | H02M 3/337 |

OTHER PUBLICATIONS

Orietti, Enrico et al., "Current Sharing in Three-Phase LLC Interleaved Resonant Converter"; IEEE Xplore Conference Paper 978-1-4244-2893-9/09, Oct. 2009, Copyright 2009 IEEE; pp. 1145-1152.
Yungtaek, Jang et al., "A Novel Active-Current-Sharing Method for Interleaved Resonant Converters"; IEEE Publication No. 978-1-4799-6735-3/15, Copyright 2015 IEEE, pp. 1461-1466.
Zhiyuan, Hu et al., "An Interleaving and Load Sharing Method for Multiphase LLC Converters"; IEEE Publication No. 978-1-4673-4355-8/13, Copyright 2013 IEEE, pp. 1421-1428.

* cited by examiner

*Primary Examiner* — Gary L Laxton
(74) *Attorney, Agent, or Firm* — Dickinson Wright PLLC; Mark E. Scott

(57) ABSTRACT

Current balancing for interleaved power converters. One example is a method of operating a power converter comprising: operating, at a switching frequency, a first power converter defining a first resonant primary, the first power converter provides a first portion of a total power provided to a load; operating, at the switching frequency, a second power converter defining a second resonant primary, the second power converter provides a second portion of the total power provided to the load; and limiting a resonant voltage of the first resonant primary by controlling energy in the first resonant primary, the controlling during periods of time when the first portion is larger than the second portion.

17 Claims, 9 Drawing Sheets

CURRENT BALANCING FOR INTERLEAVED POWER CONVERTERS

CROSS-REFERENCE TO RELATED APPLICATIONS

This application claims the benefit of U.S. Provisional Application No. 62/706,497 filed Aug. 20, 2020 and titled "Interleave LLC Current Balancing." The provisional application is incorporated herein by reference as if reproduced in full below.

BACKGROUND

Resonant power converters utilize a resonant circuit on the primary side of the power converter to create an alternating current (AC) signal applied to a primary winding of a transformer. Electrically-controlled switches on the primary side of the resonant power converter are used to create the AC signal. The AC signal applied to the primary winding transfers across the transformer to create an AC signal on a secondary winding of the transformer. The AC signal on the secondary winding is rectified to supply a direct current (DC) voltage to a load. In situations where a downstream load utilizes high current (e.g., 40 amps or more), multiple resonant power converters may be used in parallel. In order to reduce ripple of the output voltage, the resonant power converters may operate at the same frequency, but at a different phase.

When multiple resonant power converters are used, each resonant power converter is designed to be identical so that load is carried equally. However, because of factors such as manufacturing tolerances, age, and temperature, the gain characteristics as between the resonant power converters may be different. When the multiple resonant power converters have differing gain characteristics, one resonant power converter may carry more of the overall load, and can therefore suffer thermal stress and damage.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a digital signal processor (DSP), a processor with controlling software, a programmable logic device (PLD), or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to current balancing for interleaved power converters. More particularly, example embodiments are directed to interleaved power converters that include a load-balancing circuit coupled to the resonant primary of each power converter. The load-balancing circuit is designed and constructed to control or balance a portion of the load carried by each power converter by controlling or limiting the resonant voltage of each resonant primary. More particularly still, in example embodiments the load-balancing circuit is designed and constructed to selectively remove energy from the resonant primaries to balance the load as between the power converters. The specification now describes an example LLC resonant converter to orient the reader.

Figure 1:
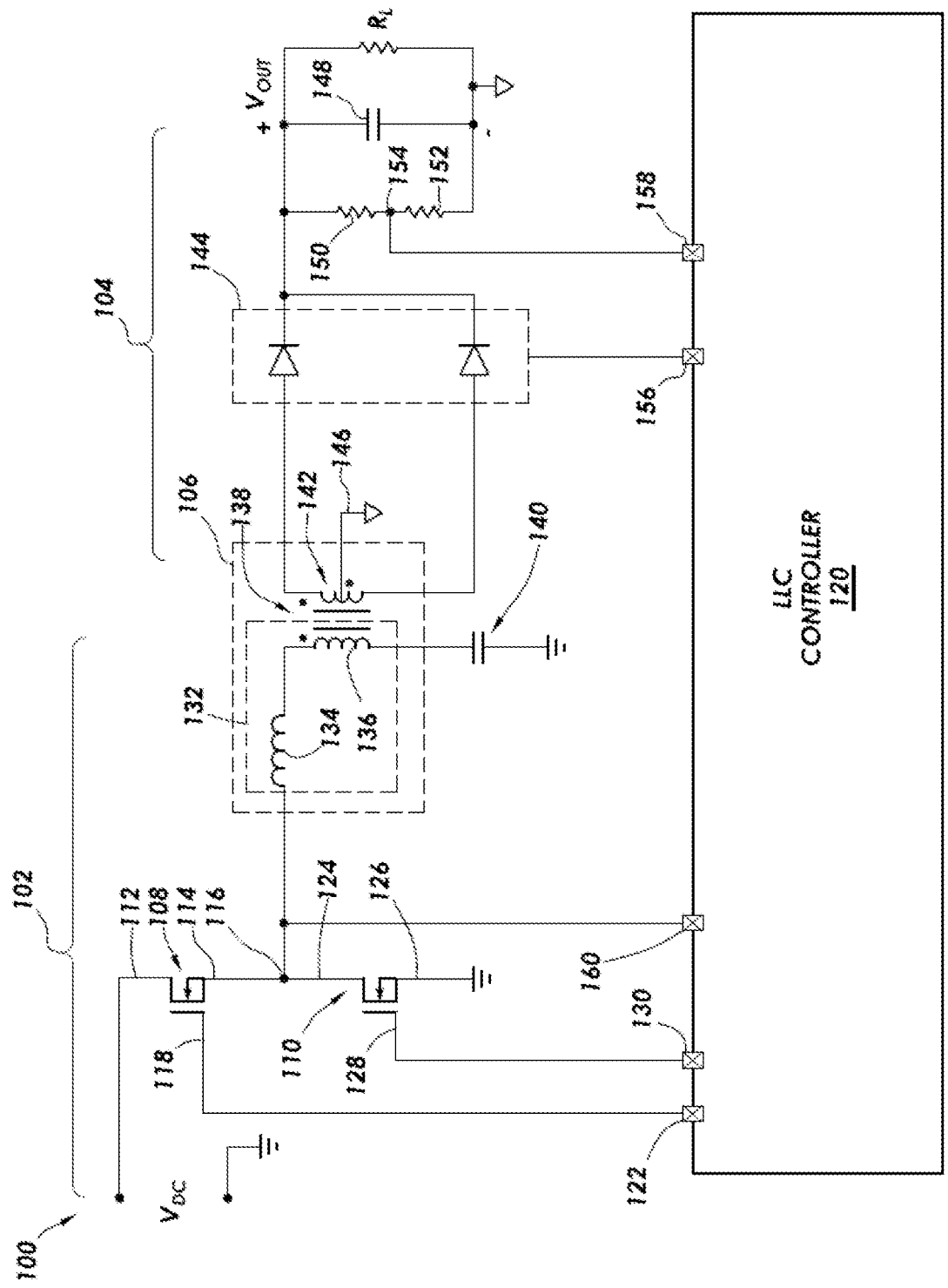
FIG. 1 shows an LLC resonant power converter in accordance with at least some embodiments.

FIG. 1 shows a power converter with a resonant primary in accordance with at least some embodiments. In particular, the power converter 100 of FIG. 1 comprises a primary side 102 and a secondary side 104 coupled by a transformer 106. Working from left to right in FIG. 1, the power converter 100 comprises a high-side electrically-controlled switch in the example form of a high-side field effect transistor (FET) 108. The high-side FET 108 has a drain 112 coupled to the input direct current (DC) voltage (hereafter input voltage $V_{DC}$), and a source 114 coupled to a switch node 116. The gate 118 of the high-side FET 108 is coupled to a controller 120 by way of a high-gate terminal 122. When commanded by the controller 120 by assertion of the gate 118, the high-side FET 108 couples the switch node 116 (and thus transformer 106) to the input voltage $V_{DC}$. The power converter 100 further comprises a low-side electrically controlled switch in the example form of a low-side FET 110. The low-side FET 110 has a drain 124 coupled to the switch node 116, and a source 126 coupled to a reference voltage on the primary side 102 (e.g., ground). The gate 128 of the low-side FET 110 is coupled to the controller 120 by way of a low-gate terminal 130. When commanded by the controller 120 by assertion of the gate 128, the low-side FET 110 couples the switch node 116 to the reference voltage on the primary side 102. In operation, the controller 120 alternately couples the switch node 116 to the input voltage $V_{DC}$ and then to the reference voltage by way of the high-side FET 108 and low-side FET 110, respectively, creating an alternating current (AC) signal at the switch node 116 (and thus applying the AC signal to the transformer 106). In order not to short the input voltage $V_{DC}$ to the reference voltage, the controller 120 is designed and constructed such that the high-side FET 108 and low-side FET 110 are not simultaneously commanded to conduct (i.e., there is a dead zone or dead band of time between assertion of the respective gates).

The switch node 116 is coupled to the primary winding 132 of the transformer 106. The primary winding 132 in FIG. 1 is shown as separated inductances, with leakage inductance of the primary winding 132 represented by leakage inductance 134, and magnetizing inductance of the primary winding 132 represented by magnetizing inductance 136 (the primary inductance associated with the metallic core 138). In series with the primary winding 132 is capacitor 140. That is, capacitor 140 is coupled between a second terminal or second connection of the primary winding 132 and the reference voltage on the primary side 102. The leakage inductance 134, the magnetizing inductance 136, and the capacitor 140 thus create a tank circuit or LLC resonant circuit on the primary side 102—and thus a resonant primary. Depending on the specific design of the power converter 100, an additional inductor may be included in the circuit (e.g., between the switch node 116 and the leakage inductance 134).

Still referring to FIG. 1, on the secondary side 104 the transformer 106 further comprises a secondary winding 142 coupled to a full-wave rectifier 144. The secondary winding 142 has a center tap 146 coupled to common on the secondary side 104. The other terminals of the secondary winding 142 are coupled to the example full-wave rectifier 144 illustrative shown as two diodes. In other cases, the center tap 146 may be electrically floated, and the two remaining terminals coupled to another example bridge rectifier having four diodes. In yet still further cases, rectification on the secondary side may be by way electrically-controlled switches (such as synchronous rectifier (SR) FETs), and in example cases the controller 120 may control the SR FETs, such as by one or more rectifier terminals 156.

The example full-wave rectifier 144 is coupled to a smoothing capacitor 148 which filters the rectified signal produced by the full-wave rectifier 144 to create the output voltage $V_{OUT}$. In the example system, a load is illustratively shown as a resistor $R_L$ (hereafter "load $R_L$") coupled across the output voltage $V_{OUT}$.

In the example system, the controller 120 may sense the output voltage $V_{OUT}$ as part of the overall control strategy. In particular, the example system has a voltage divider illustratively comprising resistor 150 and resistor 152 coupled in series. Resistor 150 is coupled to the output voltage $V_{OUT}$, and resistor 152 is coupled to common on the secondary side 104. The resistors 150 and 152 define a sense node 154 between them, and the sense node 154 is coupled to a feedback terminal 158 of the controller 120. Thus, the voltage divider creates a scaled representation of the output voltage $V_{OUT}$ provided to the feedback terminal 158. In other cases, and depending on the magnitude of the output voltage $V_{OUT}$, the voltage divider may be omitted.

The controller 120 controls the frequency of the AC signal at switch node 116 (i.e., controls the frequency of the assertion of the gate signals to the high-side FET 108 and low-side FET 110). In accordance with example embodiments, the frequency of the gate signals applied to the high-side FET 108 and low-side FET 110, and thus the fundamental frequency of the AC signal at the switch node 116, is managed or controlled based on several signals. One example signal may be the signal representative of output voltage sensed at the feedback terminal 158. Another example signal used by the controller 120 may be a signal representative of the AC signal at switch node 116 sensed at a switch-node terminal 160. Yet another example signal, not specifically shown, is a signal representative of current in the primary winding 132. The specification now turns to a set of example waveforms to explain operation of the system.

Figure 2:
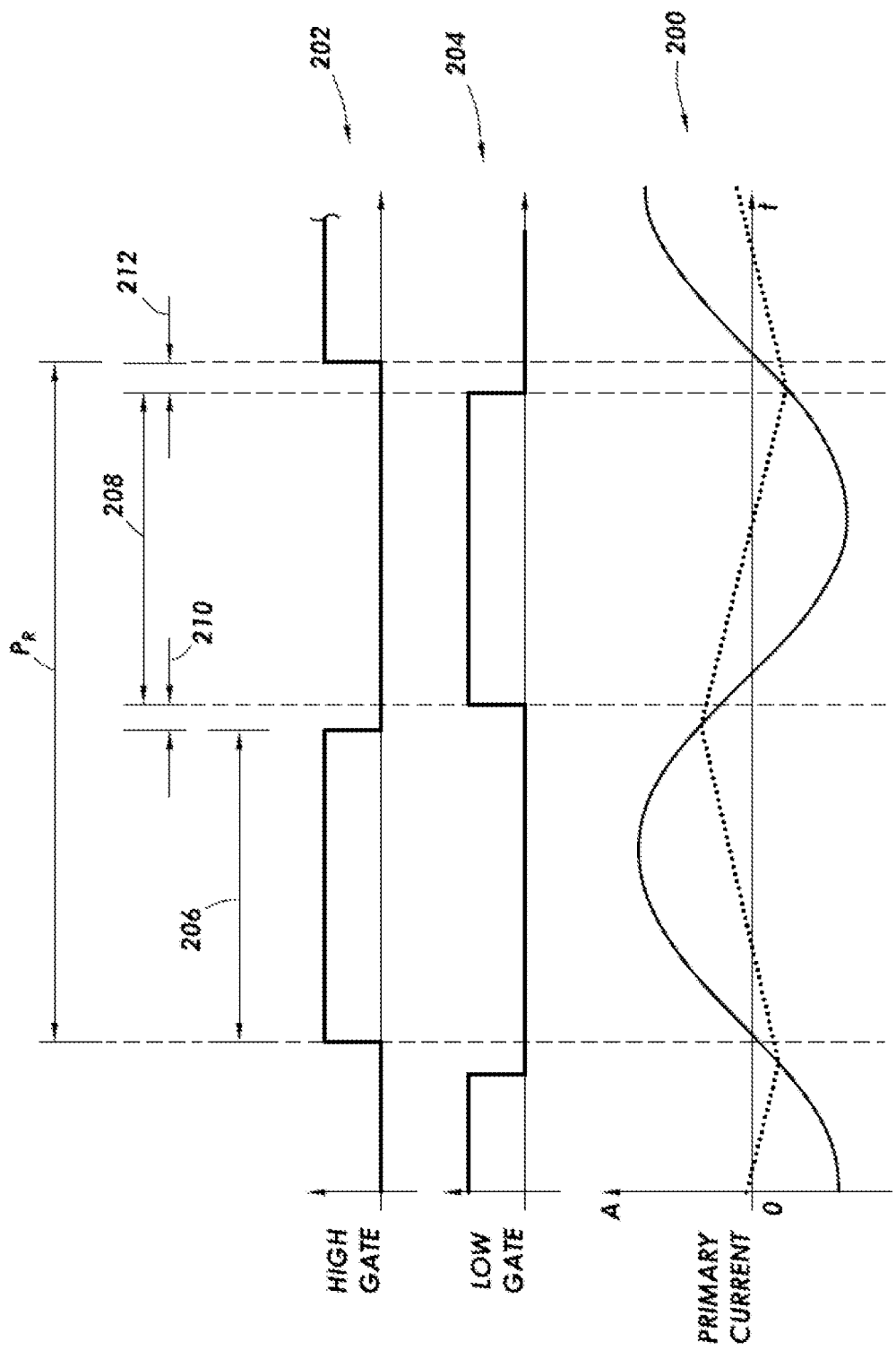
FIG. 2 shows an example set of waveforms of an LLC converter operating at resonance, in accordance with at least some embodiments.

FIG. 2 shows an example set of waveforms of a power converter with a resonant primary operating at resonance. In particular, FIG. 2 includes plot 200 that shows primary current (solid line) as well as magnetizing current (dashed line) as a function of time. FIG. 2 also includes plot 202 that shows a high-gate signal driven to the high-gate terminal 122 (FIG. 1), and plot 204 that shows a low-gate signal driven to the low-gate terminal 130 (FIG. 1). The signals for the gate terminals are plotted on corresponding time with the primary current. Moreover, the signals on the gate terminals are shown to be asserted high for purposes of discussion, but such should not be read as a limitation.

When a power converter with a resonant primary is operating at resonance, the primary current waveform or primary current signal is sinusoidal as shown in plot 200, having current flow in both directions through the primary winding. In order to create the current flow, the high-gate terminal and the low-gate terminal are alternately asserted. In particular, assertion of the high-gate signal makes the high-side FET 108 (FIG. 1) conductive, which couples the input voltage $V_{DC}$ to the switch node 116 (FIG. 1). Assertion of the low-gate signal makes the low-side FET 110 (FIG. 1) conductive, which couples the switch node 116 to the reference voltage on the primary side 102 (FIG. 1).

FIG. 2 also shows example time periods. In particular, a switching period is defined between any two consistent features of either the high-gate signal or the low-gate signal. For purposes of the discussion, the switching period PR in FIG. 2 is shown as the time between consecutive rising edges of the high-gate signal in plot 202. The switching frequency is the inverse of the switching period. Within the example switching period PR, first the high-gate signal is asserted, and then the low-gate signal is asserted. In particular, within the example switching period PR the high-gate signal has an asserted time or on-time 206, and the low-gate signal has an asserted time or on-time 208. In order to ensure that both the high-side FET 108 and the low-side FET 110 do not simultaneously conduct (thus shorting the input voltage $V_{DC}$ to ground on the primary side), there is first dead time 210 between the falling edge of the high-gate signal and the rising edge of the low-gate signal. Moreover, for the same reasons there is second dead time 212 between the falling edge of the low-gate signal and the rising edge of the high-gate signal (the rising edge at the beginning of the next switching period). Thus, within each example switching period PR there is an on-time 206 associated with the high-gate signal, a first dead time 210, an on-time 208 associated with the low-gate signal, and a second dead time 212. Considering that the dead times 210 and 212 are relatively short periods of time compared the on-times 206 and 208, the on-time 206 of the high-gate signal shall be considered to be a half period or positive half-cycle. Similarly, on-time 208 of the low-gate signal shall be considered a half period or negative half-cycle.

As the switching period increases, the on-time 206 and on-time 208 increase proportionally. Oppositely, as the switching period decreases, the on-time 206 and the on-time 208 decrease proportionally. Stated in terms of switching frequency, as the switching frequency decreases, the on-time 206 increases and the on-time 208 increases. And as the switching frequency increases, the on-time 206 decreases and the on-time 208 decreases. Stated in terms of on-time, an increase in on-time 206 of the high-gate signal results in an increase in on-time 208 of the low-gate signal, and vice versa. A decrease in the on-time 206 of the high-gate signal results in a decrease in on-time 208 of the low-gate signal, and vice versa.

Consider again plot 200 showing the primary current. When operating at resonance as shown, the primary current is sinusoidal. The amount of energy supplied the power converter 100 (FIG. 1) is controlled by the switching frequency, with the most energy transferred when the resonant converter is operated at resonance, and with less energy transferred when the resonant converter is operated above- or below-resonance. Stated otherwise, in order to control output voltage $V_{OUT}$, the frequency of the AC signal created in the resonant primary is adjusted. Thus, there may be periods of time when the power converter is operated below resonance, and at other periods of time when the power converter 100 is operated above resonance. The specification now turns to example waveforms when the LLC converter is operating at other than resonance.

Figure 3:
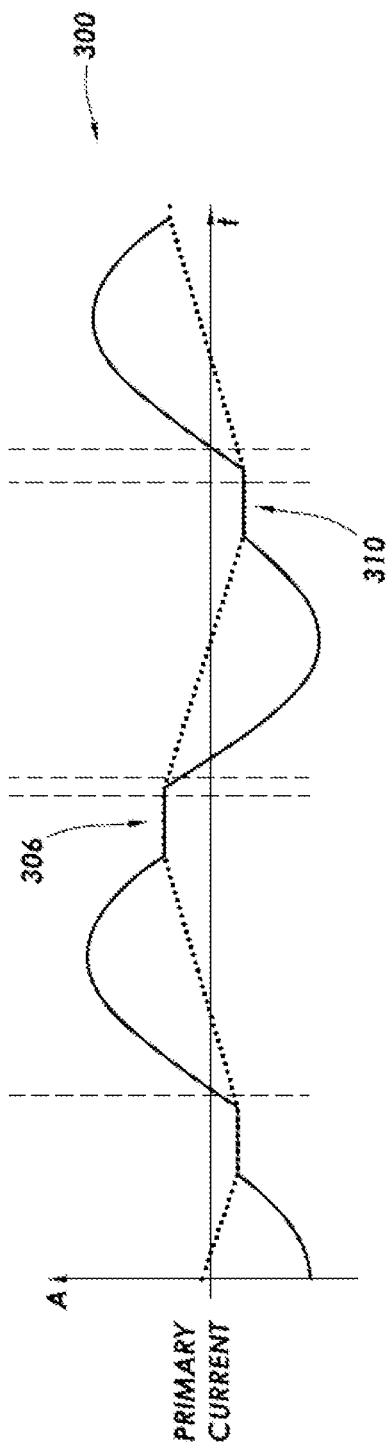
FIG. 3 shows an example primary current waveform operating below resonance, in accordance with at least some embodiments.

FIG. 3 shows an example primary current waveform operating below resonance. In particular, FIG. 3 includes a plot 300 showing primary current (solid line) as well as magnetizing current (dashed line) as a function of time in the case of operating below resonance (e.g., at a switching frequency lower than a resonant frequency of the resonant primary). When a power converter with a resonant primary is operated below resonance, the primary current signal is no longer sinusoidal. Rather, the primary current signal has various "flat" spots, such as region 306 during the on-time 308 of the high-gate signal, and region 310 during the on-time 312 of the low-gate signal. The "flat" spots as shown are actually a portion of a waveform with a frequency defined by a lower parallel resonant frequency, and thus in some cases appear "flat" as compared to the primary signal. If the switching period $P_L$ is longer than the resonant period, when the primary current is positive the primary current shape is changed as the continued application of the input voltage $V_{DC}$ to the switch node 116 (FIG. 1) resists falling current of the tank circuit, causing region 306. Similarly, when the primary current is negative the primary current tends to flatten as the continued coupling of ground on the primary side to the switch node 116 resists rising current of the tank circuit, causing region 310. Nevertheless, the primary current has a positive and negative peak in spite of the flat spots in the current. Now the specification turns to the opposite case, operating above resonance.

Figure 4:
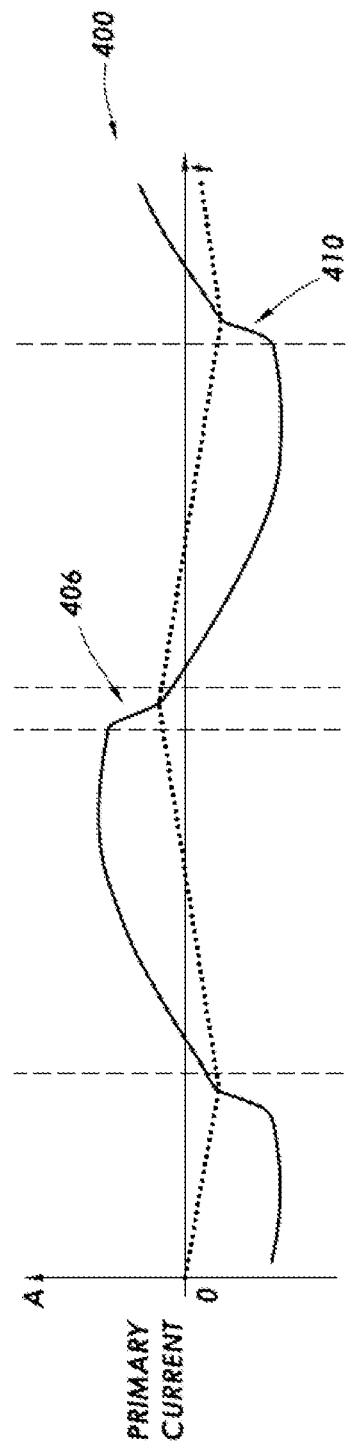
FIG. 4 shows an example primary current waveform operating above resonance, in accordance with at least some embodiments.

FIG. 4 shows an example primary current waveform operating above resonance. In particular, FIG. 4 includes a plot 400 that shows primary current (solid line) as well as magnetizing current (dashed line) as a function of time in the case of operating above resonance (e.g., at a switching frequency higher than resonant frequency of the resonant primary). When a power converter with a resonant primary is operated above resonance, again the primary current signal is no longer sinusoidal. Rather, the primary current signal has various regions where the slope of the primary current signal abruptly changes, such as region 406 after the on-time of the high-gate signal, and region 410 after the on-time of the low-gate signal. That is, if the switching period $P_S$ is shorter than the resonant period, when the primary current is positive the primary current tends to abruptly decrease as the input voltage $V_{DC}$ is disconnected from the switch node 116 (FIG. 1), causing region 406. Similarly, when the primary current is negative the primary current tends to abruptly increase as the low-gate signal 404 is disabled, causing region 410. Nevertheless, the primary current has a positive and negative peak in spite of the abrupt change in current.

The example waveforms of FIGS. 2-4 are said to be at resonance, above resonance, and below resonance, respectively. However, each waveform still has sinusoidal components, including positive peak currents and voltages, and negative peak currents and voltages. For purposes of this specification and claims, the currents and voltages of a resonant primary shall be considered resonant currents and resonant voltages even though the resonant primary may be not operating precisely at resonance.

When multiple power converters are used in parallel to supply a high current load (e.g., multiple LLC converts such as power converter 100), each power converter is designed to be identical so that load is carried equally. However, because of factors such as manufacturing tolerances, age, and temperature, the gain characteristics as between the power converters may be different. When the multiple power converters have differing gain characteristics, one power converter may carry more of the overall load, and can therefore suffer thermal stress and damage. Various example embodiments are directed to methods and related systems to implement current balancing for interleaved power converters.

Figure 5:
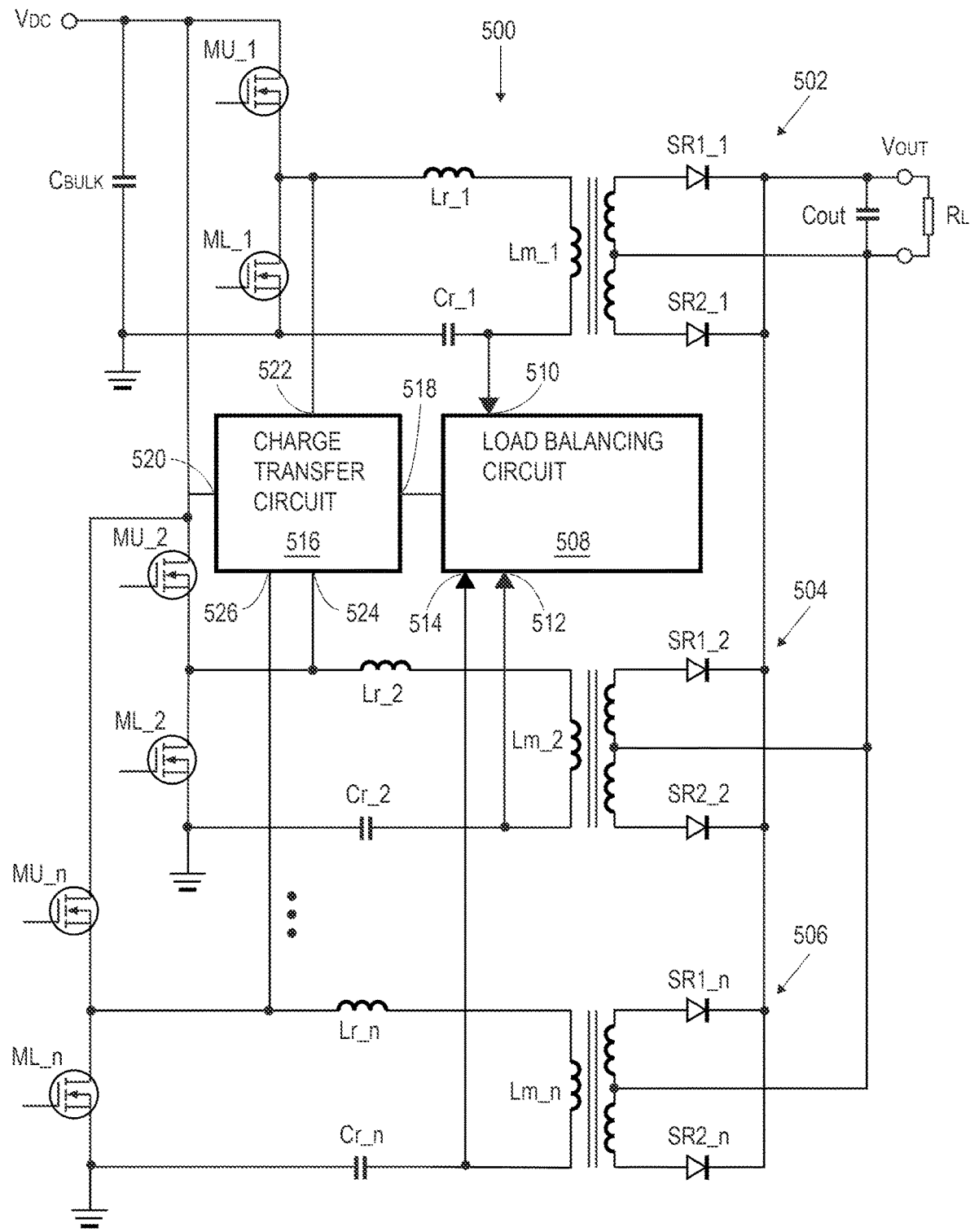
FIG. 5 shows an electrical schematic of an interleaved power converter, comprising two power converters with resonant primaries, in accordance with at least some embodiments.

FIG. 5 shows an electrical schematic of an interleaved power converter, comprising two power converters with resonant primaries. In particular, FIG. 5 shows an interleaved LLC converter 500 (hereafter just ILLC converter 500). The example ILLC converter 500 is coupled to the input voltage $V_{DC}$, and the example ILLC converter 500 defines the output voltage $V_{OUT}$ coupled to the example load $R_L$. The ILLC converter 500 includes an input capacitor or bulk capacitor $C_{BULK}$ that reduces the voltage ripple of the input voltage $V_{DC}$. The example ILLC convert 500 further comprises an output capacitor COUT that reduces voltage ripple of the output voltage $V_{OUT}$. Because of the interleaved operation of the example phases (discussed more below), the output capacitor COUT may be smaller and thus less expensive than would be used in situations where the power converter phases are operated in parallel but not interleaved.

The example ILLC converter 500 further comprises a first phase LLC converter 502 (hereafter just first converter 502), a second phase LLC converter 504 (hereafter just second converter 504), and a third phase LLC converter 506 (hereafter just third converter 506). As indicted by the ellipses in FIG. 5, additional power converters with resonant primaries may be present, and in any event two or more power converters may be used in an interleaved LLC converter. The power converters are operated at the same switching frequency, which may change as a function of load, and each power converter operates at a different phase. For two-converter ILLC systems, the phase may be 90 degrees. For three-converter ILLC systems, the phase may be 120 degrees.

Referring to the first converter 502 as representative, the first converter 502 has a high-side FET labeled MU_1 and low-side FET labeled ML_1. The switch node between MU_1 and ML_1 is coupled to an inductor Lr_1, a primary winding with magnetizing inductance Lm_1, and a resonant capacitor Cr_1. The secondary side of the first converter 502 illustratively comprises a center-tapped secondary winding of the transformer, with the center tap coupled to common on the secondary side. Two example switching rectifiers labeled SR1_1 and SR2_1 are coupled to the secondary winding, both feeding the output voltage $V_{OUT}$. A controller would be present to control the FETs, and in some cases the control the secondary rectifiers, but the controller is not shown so as not further complicate the figure.

The example second converter 504 has a similar set of components with each component carrying an "_2" designation. For example, the high-side FET and low-side FET for the second converter 504 are labelled MU_2 and ML_2, respectively. A controller would be present to control the FETs of the second converter 504, and in some cases the control the secondary rectifiers, but the controller for the second converter 504 is not shown so as not further complicate the figure.

The example third converter 506 has a similar set of components with each component carrying a "_n" designation to show any number of interleaved power converters may be used, in this case being the third phase. For example, the high-side FET and low-side FET for the third converter 506 are labelled MU_n and ML_n, respectively. A controller would be present to control the FETs of the third converter 506, and in some cases the control the secondary rectifiers, but the controller for the third converter 506 is not shown so as not further complicate the figure.

In operation the first converter 502 has a resonant current and voltage in its resonant primary. The resonant current and voltage of the first converter 502 produces a current and voltage in the secondary of the first converter 502, which is rectified to supply a first portion of the total power provided to the load $R_L$. The second converter 504 has a resonant current and voltage in its resonant primary. The resonant current and voltage of the second converter 504 produces a current and voltage in the secondary of the second converter 504, which is rectified to supply a second portion of the total power provided to the load $R_L$. Similarly, the third converter 506 has a resonant current and voltage in its resonant primary. The resonant current and voltage of the third converter 506 produces a current and voltage in the secondary of the third converter 506, which is rectified to supply a third portion of the total power provided to the load $R_L$.

When the portions of the total power are evenly split between the three example power converters, the magnitude of the resonant current and voltage in each resonant primary will about the same, but differing in phase. However, when one of the converters carries more of the total load, the magnitude of the resonant current and the magnitude of the resonant voltage will be higher than the other power converters. Stated differently still, when one of the converters carries more of the total load, the peak-to-peak resonant voltage will be greater than the other power converters.

Still referring to FIG. 5, the example ILLC converter 500 further comprises a load-balancing circuit 508 defining first sense input 510 coupled to the first converter 502 (e.g., the first resonant primary), and a second sense input 512 coupled to the second converter 504 (e.g., the second resonant primary), and a third sense input 514 coupled to the third converter 506 (e.g., the third resonant primary). If additional resonant converters are present, additional sense inputs may be present. In the example system, each sense input is coupled to a resonant node between the resonant capacitor Cr_X and its associated magnetizing inductance Lm_X. The load-balancing circuit 508 is designed and constructed to limit a resonant voltage of one or more of the resonant primaries that, in operation, has a higher peak-to-peak resonant voltage. More particularly, in example cases the load-balancing circuit 508 limits resonant voltage of one or more of the resonant primaries by controlling energy in the resonant primary, and the controlling during periods of time when the particular resonant primary (and balance of the associated resonant converter) is providing a larger portion of the total energy to the load $R_L$ than the other power converters.

Consider, as an example, a situation in which the first converter 502 is carrying more load, and thus the resonant primary of the first converter 502 has a peak-to-peak voltage greater than the resonant primaries of the other power converters. In the example situation, the load-balancing circuit 508 may extract energy from the resonant primary of the first converter 502 during the positive half-cycle of the switching period. The energy extracted may be stored on one or more capacitors within the load-balancing circuit 508 (discussed more below). Extraction of the energy during the positive half-cycle limits the peak positive voltage, and thus limits the amount of energy that can be transferred to the secondary of the example first converter 502. Continuing the example of the first converter 502 carrying more load, the load-balancing circuit 508 may extract energy from the resonant primary of the first converter 502 during the negative half-cycle of the switching period. The energy extracted may be stored on one or more capacitors within the load-balancing circuit 508 (discussed more below). Extraction of the energy during the negative half-cycle limits the peak-to-peak voltage, and thus limits the amount of energy that can be transferred to the secondary of the example first converter 502. Of course, the example of this paragraph is with respect to the first converter 502, but the example may be extended to any power converter of the ILLC converter 500 that may be carrying more of the total power provided to the load $R_L$.

The example ILLC converter 500 of FIG. 5 further comprises a charge-transfer circuit 516. The example charge-transfer circuit 516 defines an energy input 518 coupled to the load-balancing circuit 508, a drive connection 522 coupled to the input voltage $V_{DC}$, a drive connection 524 coupled to the switch node of the first converter 502, and a drive connection 526 coupled to the switch node of the second converter 504, and an extraction input 524 coupled to the switch node of the third converter 506. If additional power converters are present, the charge-transfer circuit 516 may be coupled to the switch nodes of the additional converters. However, in other cases only one connection to a switch node may be made, regardless of the number of additional converters. The example charge-transfer circuit 516 is designed and constructed to regenerate energy extracted from the resonant primaries during positive half-cycles of the switching period. In other cases, the example charge-transfer circuit 516 is designed and constructed to regenerate energy extracted from the resonant primaries during negative half-cycles of the switching period. Further still, the charge-transfer circuit 516 may both regenerate energy extracted during positive half-cycles and negative half-cycles of the switching frequency.

Consider again the situation in which the first converter 502 is carrying more load, and thus the resonant primary of the first converter 502 has a peak-to-peak voltage greater than the resonant primaries of the other power converters. In the example situation, and as before, the load-balancing circuit 508 may extract energy from the resonant primary of the first converter 502 during the positive half-cycle of the switching period. The energy extracted may be stored on one or more capacitors within the load-balancing circuit 508 (discussed more below). During a subsequent half-cycle of the switching frequency, the charge-transfer circuit 516 may transfer at least a portion of the extracted energy back to the input voltage $V_{DC}$, and thus the transferred energy may be transferred back to the resonant primary of the first converter 502. Continuing the example of the first converter 502 carrying more load, the load-balancing circuit 508 may extract energy from the resonant primary of the first converter 502 during the negative half-cycle of the switching period. The energy extracted may be stored on one or more capacitors within the load-balancing circuit 508 (discussed more below). During a subsequent positive half-cycle of the switching frequency, the charge-transfer circuit 516 may transfer at least a portion of the exacted energy back to the resonant primary of the first converter 502. Again, the example of this paragraph is with respect to the first converter 502, but the example may be extended to any power converter of the ILLC converter 500 that may be carrying more of the total power provided to the load $R_L$. The specification now turns to an example load-balancing circuit 508.

Figure 6:
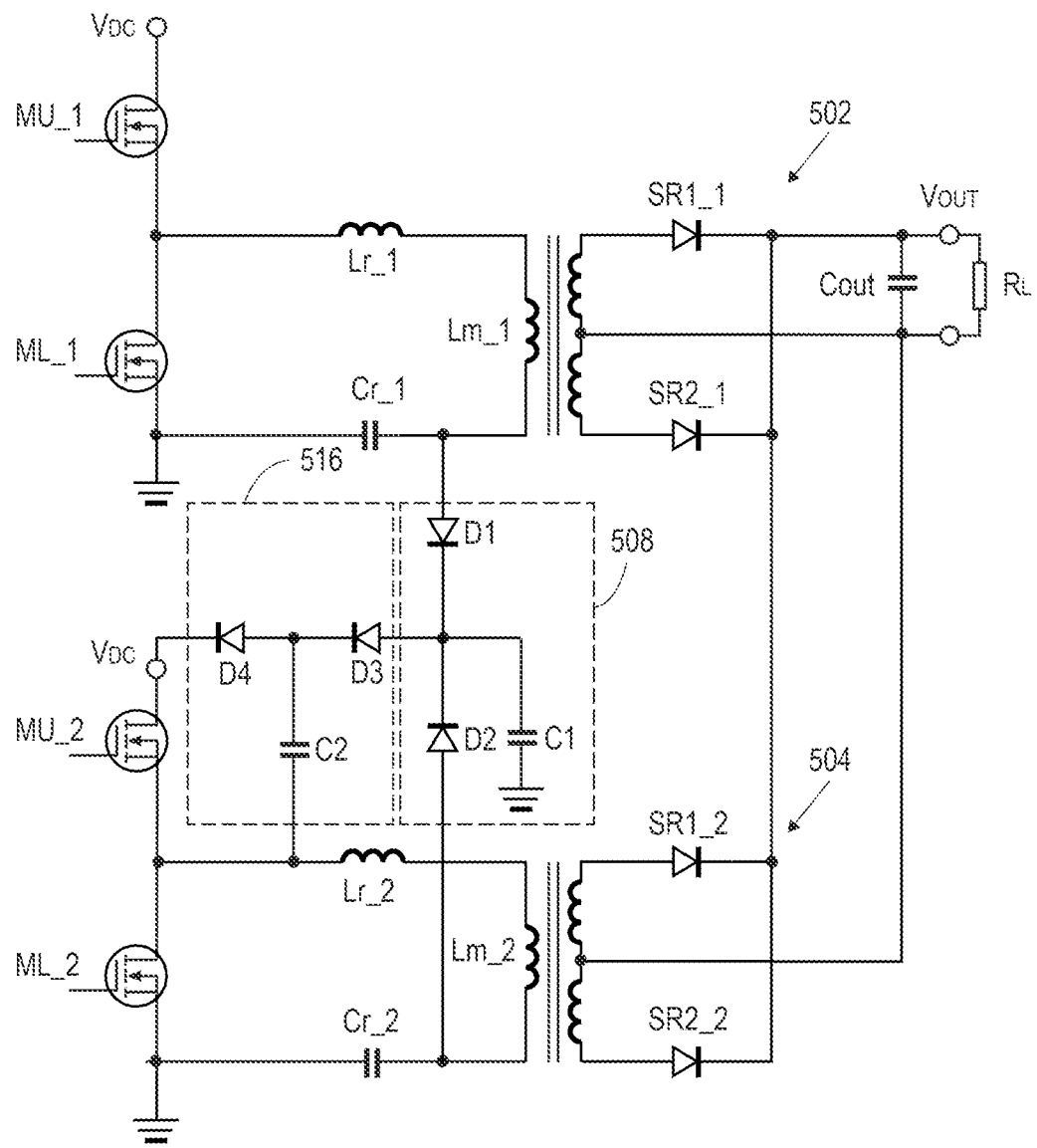
FIG. 6 shows an electrical schematic of an interleaved power converter, comprising two power converters with resonant primaries, in accordance with at least some embodiments.

FIG. 6 shows an electrical schematic of an interleaved power converter, comprising two power converters with resonant primaries. The ILLC converter of FIG. 6 is similar to the interleaved power converter of FIG. 5, with the exception of having exactly two power converters; thus, the power converter numbering and component naming convention is carried forward to FIG. 6. FIG. 6 also shows an example load-balancing circuit 508 as well as an example charge-transfer circuit 516. Each will be discussed in turn.

The example load-balancing circuit 508 comprises: a diode D1 defining a cathode, and the diode D1 defining an anode coupled to the resonant node between the magnetizing inductance Lm_1 and a lead of the resonant capacitor Cr_1; a diode D2 defining a cathode, and the diode D2 defining an anode coupled to the resonant node between the magnetizing inductance Lm_2 and a lead of the resonant capacitor Cr_2; and a clamp capacitor C1 having a first lead coupled the cathodes of diodes D1 and D2, and a second lead coupled to the reference voltage on the primary side. In cases of an ILLC converter having two interleaved power converters with resonant primaries, the power converters operate at the same switching frequency, but differing phase (e.g., 90 degrees phase difference). For purposes of explanation assume that: the first converter 502, while operating at the switching frequency, is the leading power converter (e.g., no phase delay); the second converter 504, while operating at the switching frequency, is the lagging power converter (e.g., 90 degrees of phase delay); and at the beginning of the positive half-cycle of the leading power converter a non-zero positive voltage is held on the clamp capacitor C1.

With the assumptions in mind, consider the first converter 502. During the positive half-cycle of the switching frequency (e.g., when the high-side FET MU_1 is conductive), current initially rises in the resonant primary of the first converter 502, and thus the voltage at the resonant node initially rises. During the positive half-cycle, the voltage at the resonant node reaches a peak positive value, and then starts to fall. During the negative half-cycle of the switching frequency (e.g., when the low-side FET ML_1 is conductive), current reverses direction in the resonant primary of the first converter 502, and thus the voltage at the resonant node initially falls. In some cases, and depending on the magnitude of the input voltage $V_{DC}$, during the negative half-cycle the voltage at the resonant node reaches a lowest positive value (e.g., a minima yet still positive value) and then starts to rise. In other cases, during the negative half-cycle the peak-to-peak voltage swing at the resonant node creates a negative voltage relative to the reference voltage on the primary side. For purposes of explanation, the specification from this point forward assumes the peak-to-peak voltage at the resonant node of each converter is smaller than the magnitude of the input voltage $V_{DC}$, and thus the upper peak and lower trough of the peak-to-peak voltages are both positive voltages. However, the example circuits work equally well in the case where the lower trough reaches a negative voltage relative to the reference voltage on the primary side.

If the upper peak voltage of the resonant primary of the first converter 502 remains below the voltage held on the clamp capacitor C1, then no current is diverted to the clamp capacitor C1, and thus no energy is extracted. On the other hand, if the upper peak voltage of the resonant primary of the first converter 502 exceeds the voltage held on the clamp capacitor C1, then a portion the current flowing in the resonant primary of the first converter 502 flows to and charges the clamp capacitor C1. Thus, the example load-balancing circuit 508 extracts energy from the resonant primary of the first converter 502. By extracting energy during the positive half-cycle of the resonant voltage of the first converter 502, the amount of energy that can be transferred across the transformer, and ultimately provided to the load $R_L$, is limited. It follows that the example load-balancing circuit 508 of FIG. 6 may be considered a positive clipping circuit.

Now consider the example second converter 504 of FIG. 6. If the peak positive voltage of the resonant primary of the second converter 504 remains below the voltage held on the clamp capacitor C1, then no current is diverted to the clamp capacitor C1, and thus no energy is extracted. On the other hand, if the peak positive voltage of the resonant primary of the second converter 504 exceeds the voltage held on the clamp capacitor C1, then a portion the current flowing in the resonant primary of the second converter 504 flows to and charges the clamp capacitor C1. Thus, the example load-balancing circuit 508 extracts energy from resonant primary of the second converter 504. By extracting energy during the positive half-cycle of the resonant voltage of the first converter 502, the amount of energy that can be transferred across the transformer, and ultimately provided to the load $R_L$, is limited. It again follows that the example load-balancing circuit 508 of FIG. 6 may be considered a peak clipping circuit.

Though there may be situations in which energy is extracted from both the first converter 502 and the second converter 504 (e.g., transient operation associated with large step-changes in load), in steady-state operation only one of the power converters will have higher peak-to-peak resonant voltage, and thus energy will be extracted from only one of the power converters.

Still referring to FIG. 6. The example system of FIG. 6 further comprises the charge-transfer circuit 516. The example charge-transfer circuit 516 comprises: a diode D3 having an anode coupled to the cathodes of diodes D1 and D2, and a cathode; a diode D4 having an anode coupled to the cathode of diode D3, and a cathode coupled to the input voltage $V_{DC}$; a capacitor C2 having a first lead coupled to the cathode of diode D3, and a second lead coupled to the switch node of the resonant primary of the second converter 504. The anode of diode D3 defines a charge input, and the cathode of diode D4 defines a charge output. The charge-transfer circuit 516 is designed and constructed to transfer at least a portion of the energy stored on the clamp capacitor C1 back to the resonant primaries. The description of operation is conceptually divided into the positive half-cycle and negative half-cycle of the switching frequency of the second converter 504.

Considering first the negative half-cycle, during the negative half-cycle the low-side FET ML_2 is conductive, and thus the second lead of the capacitor C2 is effectively at the reference voltage on the primary side. During the negative half-cycle, assuming the clamp capacitor C1 has voltage higher than the capacitor C2, current flows from the clamp capacitor C1, through diode D3, and charges capacitor C2. Stated otherwise, at least a portion of the energy extracted from any resonant primary during the immediately previous positive half-cycle is transferred to the capacitor C2 during the negative half-cycle.

Now considering an immediately subsequent positive half-cycle. During the immediately subsequent positive half-cycle, the high-side FET MU_2 is conductive, and thus the second lead of the capacitor C2 is effectively at the input voltage $V_{DC}$. The electrical current stored in capacitor C2 during the prior half-cycle is forced from the capacitor C2, through the diode D4, to the input voltage $V_{DC}$. Thus, such transferred current and energy may be available to any resonant primary, in the example situation of the FIG. 6 the current may flow through the high-side FET MU_2 and contribute charging of the inductances during the positive half-cycle. Note that since the transfer is taking place during the positive half-cycle, the capacitor C2 and other components are regenerating or recuperating the energy from the capacitor C2 while simultaneously the load-balancing circuit 508 may be extracting energy from either the first converter 502 or second converter 504 experiencing higher peak-to-peak resonant voltage.

In some situations, extracting energy only during the positive half-cycles of the switching frequency may be sufficient to balance load among the power converters. However, in other cases the balancing action may be applied to the negative peak voltages.

Figure 7:
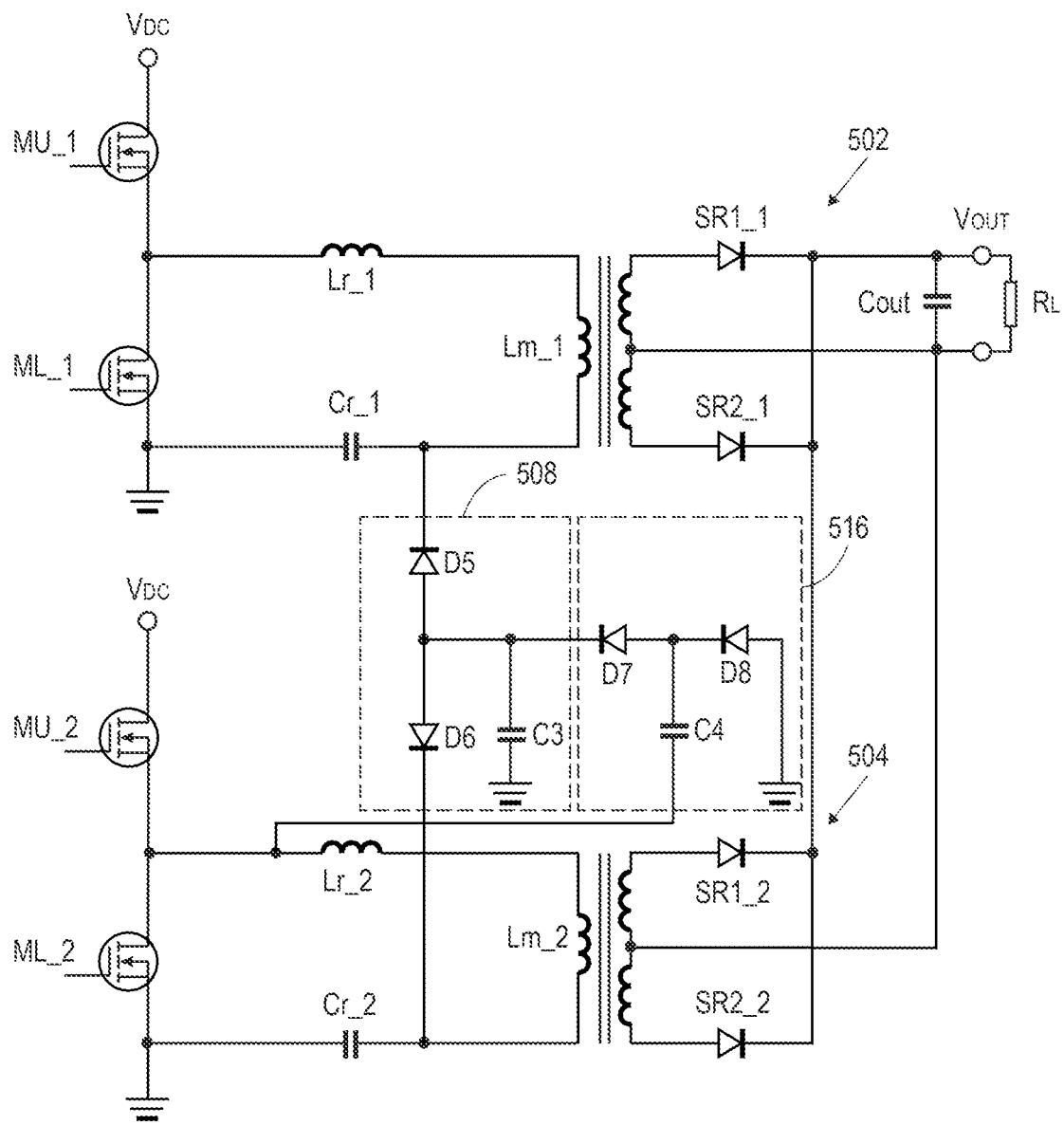
FIG. 7 shows an electrical schematic of an interleaved power converter, comprising two power converters with resonant primaries, in accordance with at least some embodiments.

FIG. 7 shows an electrical schematic of an interleaved power converter, comprising two power converters with resonant primaries. The ILLC converter of FIG. 7 is similar to the interleaved power converter of FIG. 5, with the exception of having exactly two power converters; thus, the power converter numbering and component naming convention is carried forward to FIG. 7. FIG. 7 also shows another example load-balancing circuit 508 as well as another example charge-transfer circuit 516. Each will be discussed in turn.

The example load-balancing circuit 508 of FIG. 7 comprises: a diode D5 defining an anode, and the diode D5 defining a cathode coupled to the resonant node between the magnetizing inductance Lm_1 and a lead of the resonant capacitor Cr_1; a diode D6 defining an anode, and the diode D6 defining a cathode coupled to the resonant node between the magnetizing inductance Lm_2 and a lead of the resonant capacitor Cr_2; and a clamp capacitor C3 having a first lead coupled the anodes of diodes D5 and D6, and a second lead coupled to the reference voltage on the primary side. As before, the interleaved resonant converters operate at the same switching frequency, but differing phase (e.g., 90 degrees phase difference). For purposes of explanation assume that: the first converter 502, while operating at the switching frequency, is the leading power converter (e.g., no phase delay); the second converter 504, while operating at the switching frequency, is the lagging power converter (e.g., 90 degrees of phase delay); and at the beginning of the negative half-cycle of the leading power converter, an initial voltage is held on the clamp capacitor C3.

With the assumptions in mind, consider the first converter 502. During the negative half-cycle of the switching frequency (e.g., when the low-side FET ML_1 is conductive), current flows from the capacitor Cr_1. The voltage at the resonant node reaches a lower trough voltage and then starts to rise. If the lower trough voltage of the resonant node of the first converter 502 has a magnitude larger than the magnitude of the voltage held on the clamp capacitor C3, then no current is provided from the clamp capacitor C3, and thus no energy is extracted from resonant primary of the first converter 502. On the other hand, if the lower trough voltage of the resonant node of the first converter 502 has a magnitude smaller than the magnitude of the voltage held on the clamp capacitor C3, then the clamp capacitor C3 injects or provides current through the diode D5 into the resonant primary of the first converter 502. Thus, the example load-balancing circuit 508 extracts energy from the resonant primary of the first converter 502. By extracting energy during the negative half-cycle of the resonant voltage of the first converter 502, the peak-to-peak voltage is reduced and thus amount of energy that can be transferred across the transformer and ultimately provided to the load $R_L$ is limited. It follows that the example load-balancing circuit 508 of FIG. 7 may be considered trough clipping circuit.

Now consider the example second converter 504 of FIG. 7. During the negative half-cycle of the switching frequency (e.g., when the low-side FET ML_1 is conductive), current flows from the capacitor Cr_2. The voltage at the resonant node reaches a lower trough voltage and then starts to rise. If the lower trough voltage of the resonant primary of the second converter 504 has a magnitude larger than the magnitude of the voltage held on the clamp capacitor C3, then no current is provided from the clamp capacitor C3, and thus no energy is extracted from resonant primary of the second converter 502. On the other hand, if the lower trough voltage of the resonant primary of the second converter 502 has a magnitude smaller than the magnitude of the voltage held on the clamp capacitor C3, then the clamp capacitor C3 injects or provides current through the diode D6 into the resonant primary of the second converter 502. Thus, the example load-balancing circuit 508 of FIG. 7 extracts energy from the resonant primary of the second converter 504. By extracting energy during the negative half-cycle of the resonant voltage of the second converter 504, the peak-to-peak voltage is reduced and thus amount of energy that can be transferred across the transformer and ultimately provided to the load $R_L$ is limited. It again follows that the example load-balancing circuit 508 of FIG. 7 may be considered a trough clipping circuit.

Though there may be situations in which energy is extracted from both the first converter 502 and the second converter 504 (e.g., transient operation associated with large step-changes in load), in steady-state operation only one of the power converters will have higher peak-to-peak resonant voltage (e.g., as caused by manufacturing tolerances between otherwise identical components), and thus energy will be extracted from only one of the power converters.

Still referring to FIG. 7. The example system of FIG. 7 further comprises the example charge-transfer circuit 516. The example charge-transfer circuit 516 comprises: a diode D7 having a cathode coupled to the anodes of diodes D5 and D6, and a cathode; a diode D8 having a cathode coupled to the anode of diode D7, and an anode coupled to the reference voltage on the primary side; and a capacitor C4 having a first lead coupled to the anode of diode D7, and a second lead coupled to the switch node of the resonant primary of the second converter 504. The charge-transfer circuit 516 of FIG. 7 is designed and constructed recuperate or regenerate energy stored on the capacitor C3. The description of operation is conceptually divided into the positive half-cycle and negative half-cycle of the switching frequency of the second converter 504.

Considering first the negative half-cycle. Assume for now that at the instant in time when the negative half-cycle begins, the capacitor C4 holds a negative voltage (e.g., the lower lead connected to the switch node is positive and the upper lead connected to the anode of diode D7 is negative). During the negative half-cycle, the low-side FET ML_2 is conductive, and thus the second lead of the capacitor C4 is effectively at the reference voltage on the primary side. During the negative half-cycle current flows from the reference voltage on the primary side, through the diode D8, and to the upper plate of the capacitor C4. Note that current is flowing to the capacitor C4 through diode D8 during the negative half-cycle, while simultaneously the load-balancing circuit 508 is extracting energy from either the first converter 502 or second converter 504 experiencing higher peak-to-peak resonant voltage.

Now consider an immediately subsequent positive half-cycle. During the positive half-cycle the high-side FET MU_2 is conductive, and thus the second lead of the capacitor C4 is effectively at the input voltage $V_{DC}$. Electrical current stored on the capacitor C4 during the prior positive half-cycle is thus pumped or forced through the diode D7 to the clamp capacitor C3.

Conceptually, with respect to the charge-transfer circuit 516 of FIG. 7, the recuperation or regeneration of energy back to the resonant primary of the second converter 504 occurs during the negative half-cycle through the reference voltage on the primary side. That is, during the negative half-cycle where the lower lead of the capacitor C4 is effectively coupled to the reference voltage on the primary side, current flows through the diode D8 to the upper lead of the capacitor C4. The current flow through the diode D8 from the reference voltage on the primary side is conceptually opposite normal current flow, and thus by conservation of energy principles a balancing current occurs elsewhere. In particular, a portion of the current flow in the resonant primary of the second converter 504 can be thought of as providing the current through diode D8 (through the ground or common connection) rather than being "lost" to actual ground. Stated differently, during the negative half-cycle, the capacitor C4 helps draw current from the resonant capacitor Cr_2 and around the resonant primary of the second converter 504, and thus recuperates or regenerates the energy previously held on the capacitor C3.

In some situations, extracting energy only during the negative half-cycles of the switching frequency may be sufficient to balance load among the power converters. However, in other cases the balancing action may be applied to both the positive peak voltages and the negative peak voltages.

Figure 8:
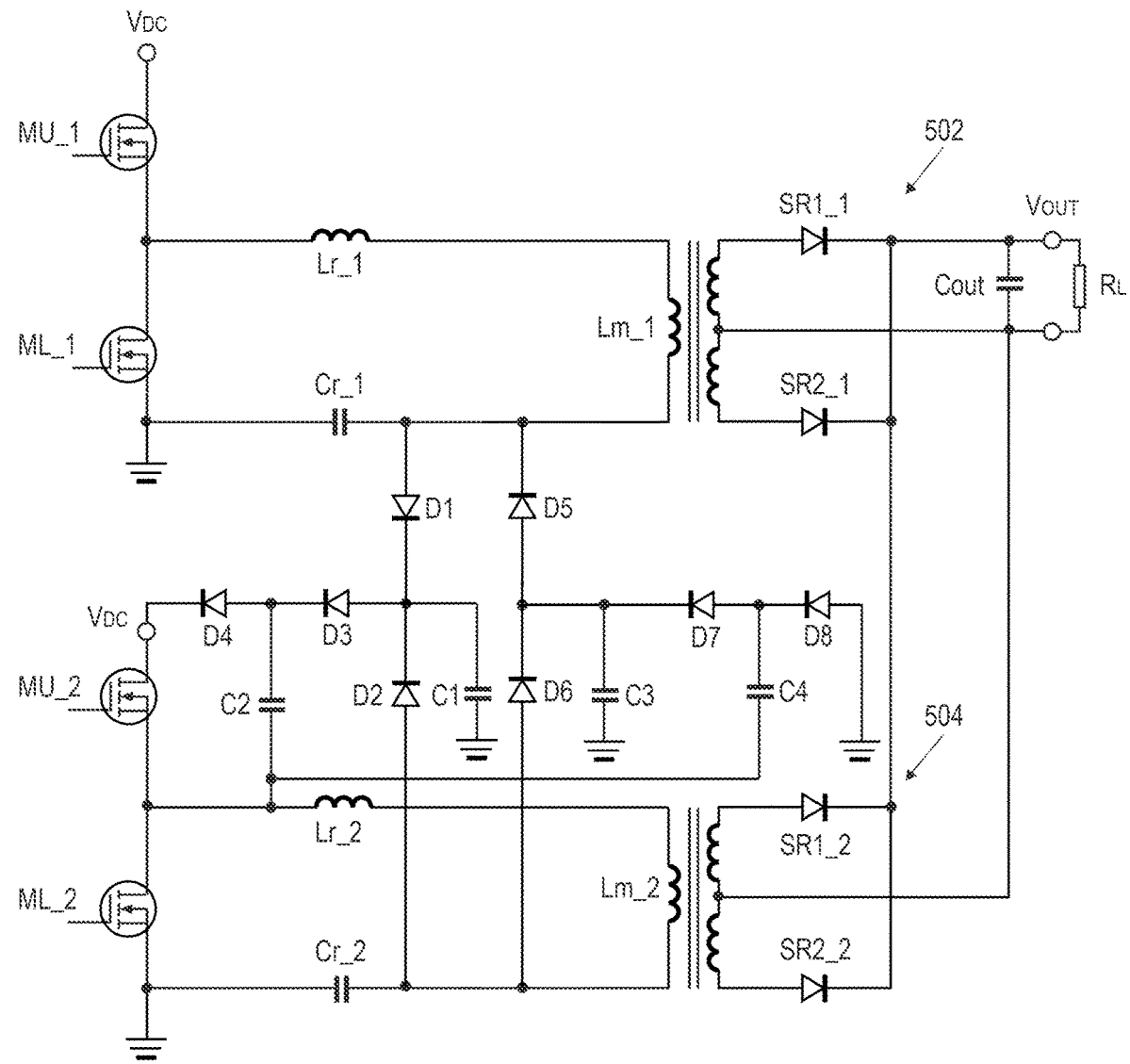
FIG. 8 shows an electrical schematic of an interleaved power converter, comprising two power converters with resonant primaries, in accordance with at least some embodiments.

FIG. 8 shows an electrical schematic of an interleaved power converter, comprising two power converters with resonant primaries. The ILLC converter of FIG. 8 is similar to the resonant power converter of FIG. 5, with the exception of having exactly two power converters; thus, the power converter numbering and component naming convention is carried forward to FIG. 8. The example circuit of FIG. 8 includes both the load-balancing circuits of FIGS. 6 and 7, carrying the same component designations. Moreover, the example circuit includes both the charge-transfer circuits of FIGS. 6 and 7, again carrying the same component designations. Thus, the various components and their operation will not be repeated again here so as not to unduly lengthen and/or complicate the disclosure. Suffice it to say that in the example system of FIG. 8, extracting power may occur during in both the positive half-cycles and the negative half-cycles. Moreover, the various components that make up the charge-transfer circuits transfer respective extracted power during respective positive half-cycles and negative half-cycles.

The various example discussed to this point have assumed that extracted energy is regenerated or recuperated by being supplied back to the second converter 504. In other cases, however, the energy extracted may be regenerated or recuperated by being provided to both the first converter 502 and the second converter 504.

Figure 9:
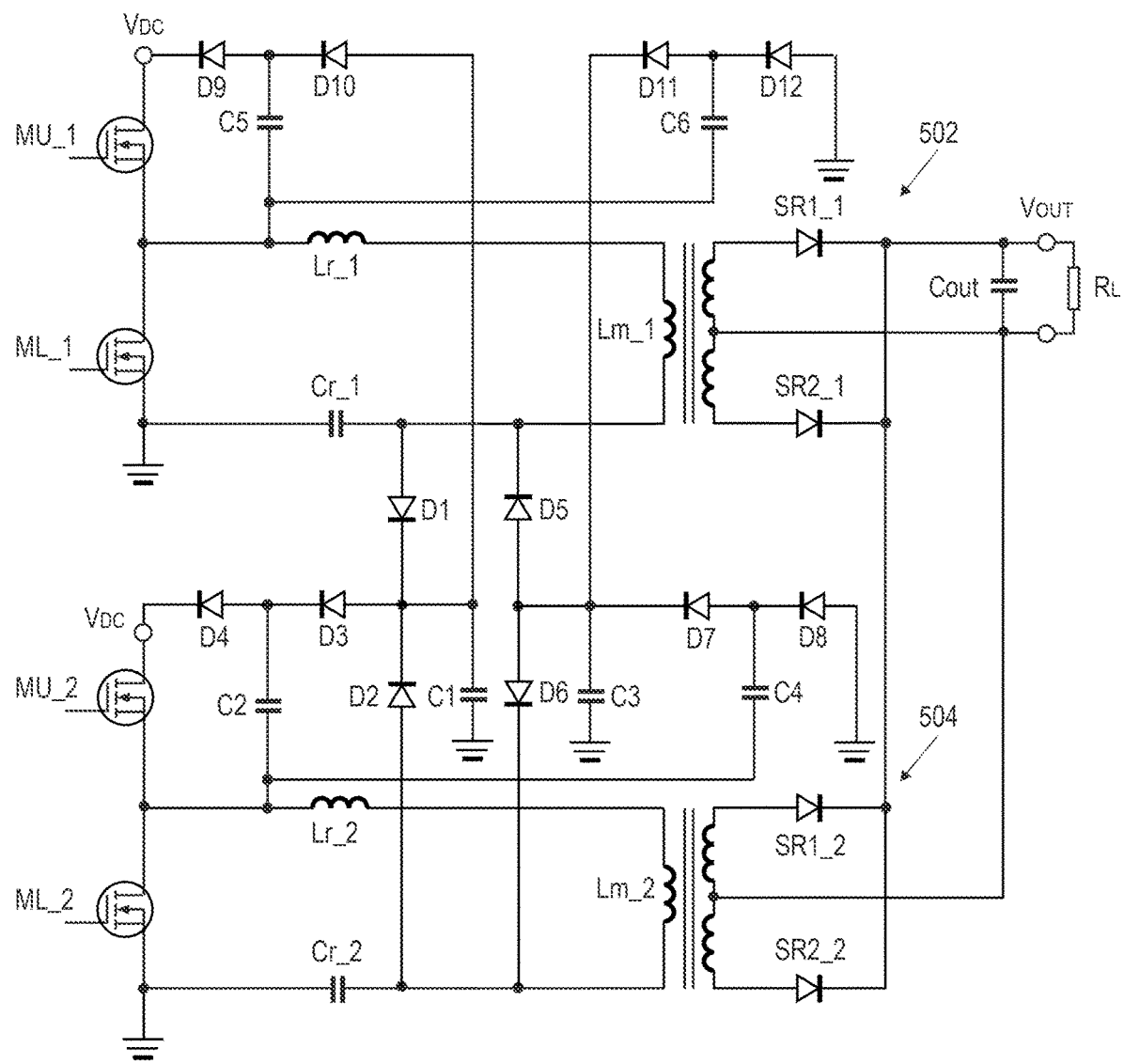
FIG. 9 shows an electrical schematic of an interleaved power converter, comprising two power converters with resonant primaries, in accordance with at least some embodiments.

FIG. 9 shows an electrical schematic of an interleaved power converter, comprising two power converters with resonant primaries. The ILLC converter of FIG. 9 is similar to the resonant power converter of FIG. 5, with the exception of having exactly two power converters; thus, the power converter numbering and component naming convention is carried forward to FIG. 9. The example circuit of FIG. 9 includes both the load-balancing circuits of FIGS. 6 and 7, carrying the same component designations. Moreover, the example circuit includes both the charge-transfer circuits of FIGS. 6 and 7, again carrying the same component designations. Thus, the various components and their operation will not be repeated again here so as not to unduly lengthen and/or complicate the disclosure. Suffice it to say that in the example system of FIG. 9, extracting power may occur during both the positive half-cycles and the negative half-cycles. Moreover, the various components that make up the charge-transfer circuits previously described transfer respective extracted power during respective positive half-cycles and negative half-cycles.

FIG. 9 further comprises additional charge-transfer circuits associated with the first converter 502. In particular, the example power converter FIG. 9 includes a charge-transfer circuit that comprises: a diode D10 having an anode coupled to the cathodes of diodes D1 and D2, and a cathode; a diode D9 having an anode coupled to the cathode of diode D3, and a cathode coupled to the input voltage $V_{DC}$; a capacitor C5 having a first lead coupled to the cathode of diode D10, and a second lead coupled to the switch node of the resonant primary of the first converter 502. The charge-transfer circuit is designed and constructed to transfer at least a portion of the energy stored on the clamp capacitor C1 to the first converter 502. The description of operation is duplicative of the charge-transfer circuit 516 of FIG. 5, and thus we will not be repeated again here, except to say that operation is with respect to the switching frequency and phase of the first converter 502. Thus, energy extracted and stored on capacitor C1 may be transferred in part back to first converter 502 and transferred in part back to the second converter 504.

FIG. 9 further comprises yet another charge-transfer circuit associated with the first converter 502. In particular, the example power converter FIG. 9 includes a charge-transfer circuit that comprises: a diode D11 having a cathode coupled to the anodes of diodes D5 and D6, and a cathode; a diode D12 having a cathode coupled to the anode of diode D11, and an anode coupled to the reference voltage on the primary side; and a capacitor C6 having a first lead coupled to the anode of diode D11, and a second lead coupled to the switch node of the resonant primary of the second converter 504. The charge-transfer circuit is designed and constructed to transfer at least a portion of the energy stored on the clamp capacitor C3. The description of operation is duplicative of the charge-transfer circuit 516 of FIG. 6, and thus we will not be repeated again here, except to say that operation is with respect to the switching frequency and phase of the first converter 502. Thus, energy extracted and stored on capacitor C3 may be transferred in part back to first converter 502 and the transferred in part back to the second converter 504.

Figure 10:
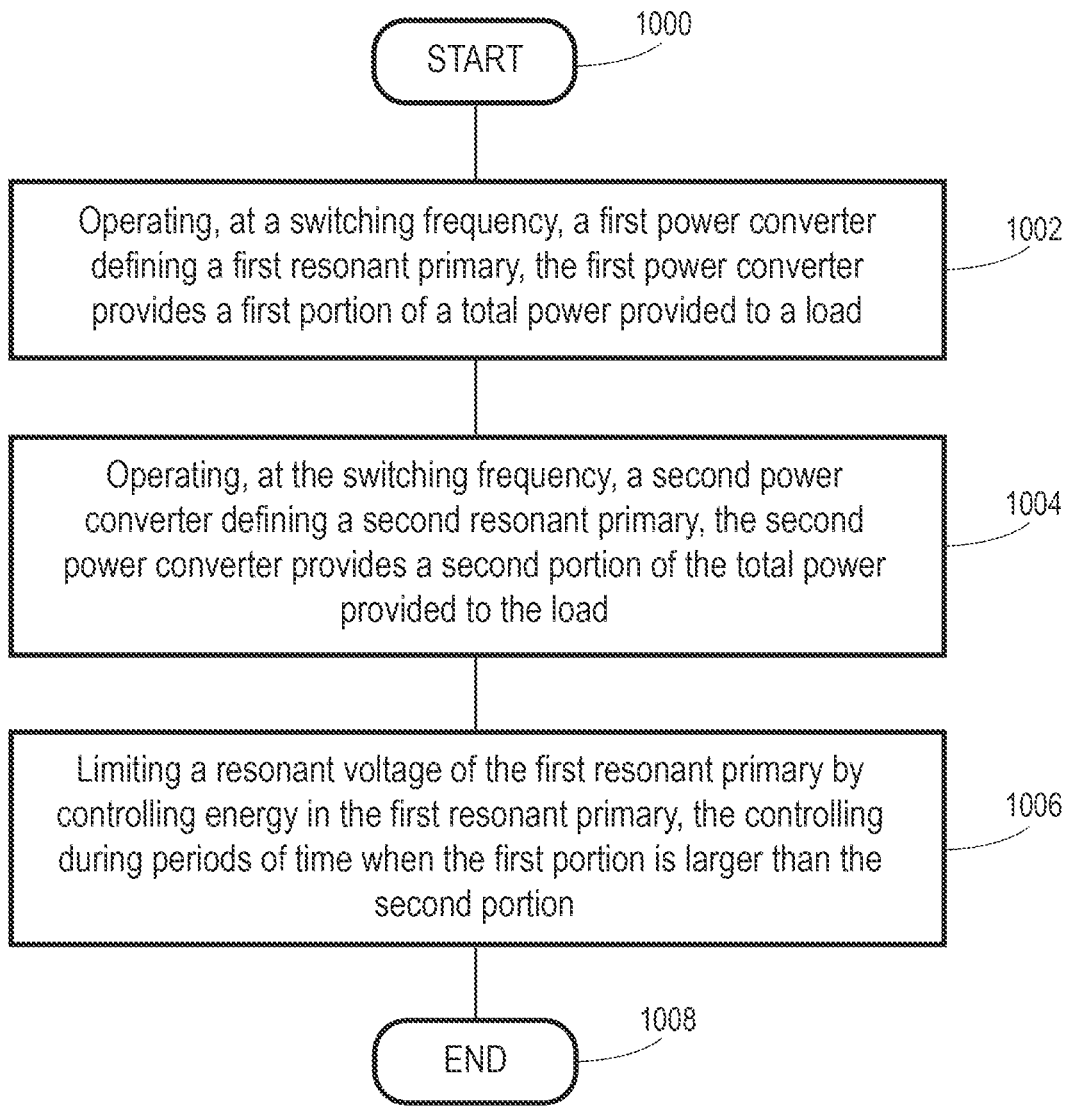
FIG. 10 shows a method in accordance with at least some embodiments.

FIG. 10 shows a method in accordance with at least some embodiments. In particular, the method starts (block 1000) and comprises: operating, at a switching frequency, a first power converter defining a first resonant primary, the first power converter provides a first portion of a total power provided to a load (block 1002); operating, at the switching frequency, a second power converter defining a second resonant primary, the second power converter provides a second portion of the total power provided to the load (block 1004); and limiting a resonant voltage of the first resonant primary by controlling energy in the first resonant primary, the controlling during periods of time when the first portion is larger than the second portion (block 1006). Thereafter, the method ends (block 1008).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter comprising:
   operating, at a switching frequency, a first power converter defining a first resonant primary, the first power converter provides a first portion of a total power provided to a load;
   operating, at the switching frequency, a second power converter defining a second resonant primary, the second power converter provides a second portion of the total power provided to the load; and
   limiting a resonant voltage of the first resonant primary by controlling energy in the first resonant primary during periods of time when the first portion is larger than the second portion,
   wherein controlling energy in the first resonant primary further comprises extracting power, during a positive half-cycle of the switching frequency or a negative half-cycle of the switching frequency, from the first resonant primary and storing the power in a clamp capacitor.

2. The method of claim 1 further comprising transferring at least a portion of the power in the clamp capacitor to the first resonant primary in a subsequent half-cycle of the switching frequency.

3. The method of claim 1 further comprising transferring, in a subsequent half-cycle of the switching frequency, at least a portion of the power in the clamp capacitor to the first resonant primary.

4. The method of claim 1 further comprising:
   transferring, in a subsequent half-cycle of the switching frequency, at least a portion of the power in the clamp capacitor to the first resonant primary; and
   transferring, in the subsequent half-cycle of the switching frequency, at least a portion of the power in the clamp capacitor to the second resonant primary.

5. The method of claim 1 further comprising transferring at least a portion of the power in the clamp capacitor to the first resonant primary in a subsequent half-cycle of the switching frequency.

6. The method of claim 1 further comprising transferring, in a subsequent half-cycle of the switching frequency, at least a portion of the power in the clamp capacitor to the first resonant primary.

7. The method of claim 1 further comprising:
   transferring, in a subsequent half-cycle of the switching frequency, at least a portion of the power in the clamp capacitor to the first resonant primary; and
   transferring, in the subsequent half-cycle of the switching frequency, at least a portion of the power in the clamp capacitor to the second resonant primary.

8. The method of claim 1, wherein the clamp capacitor is a first clamp capacitor, wherein controlling energy in the first resonant primary further comprises:
   extracting power, during the positive half-cycle of the switching frequency, from the first resonant primary and storing the power in the first clamp capacitor; and
   extracting power, during the negative half-cycle of the switching frequency, from the first resonant primary and storing the power in a second clamp capacitor.

9. The method of claim 8 further comprising:
   transferring, in a subsequent half-cycle of the switching frequency, at least a portion of the power in the first clamp capacitor to the first resonant primary; and
   transferring, in a subsequent half-cycle of the switching frequency, at least a portion of the power in the second clamp capacitor to the first resonant primary.

10. The method of claim 9 wherein transferring at least a portion of the power in the first clamp capacitor further comprises transferring at least a portion of the power in the first clamp capacitor to both the first resonant primary and the second resonant primary.

11. The method of claim 9 wherein transferring at least a portion of the power in the second clamp capacitor further comprises transferring at least a portion of the power in the second clamp capacitor to both the first resonant primary and the second resonant primary.

12. An interleaved power converter comprising:
a first converter comprising a first resonant primary coupled to an input voltage, and the first converter defining a secondary side with an output voltage;
a second converter comprising a second resonant primary coupled to the input voltage, and the second converter defining a secondary side coupled to the output voltage;
a load-balancing circuit defining a first sense input coupled to the first resonant primary, and a second sense input coupled to the second resonant primary, the load-balancing circuit configured to limit a resonant voltage of the first resonant primary or the second resonant primary that, in operation of the interleaved power converter, has a higher peak-to-peak resonant voltage,
wherein the load-balancing circuit further comprises:
a first diode defining an anode coupled to the first resonant primary, and a cathode;
a second diode defining an anode coupled to the second resonant primary, and a cathode; and
a clamp capacitor having a first lead coupled the cathodes, and a second lead coupled to a reference voltage.

13. The interleaved power converter of claim 12 further comprising a charge-transfer circuit comprising a charge input coupled to the load-balancing circuit, and a charge output coupled to the input voltage, the charge-transfer circuit configured to transfer energy from the load-balancing circuit to the input voltage.

14. The interleaved power converter of claim 12 further comprising a charge-transfer circuit comprising a charge input coupled to the cathodes, and a charge output coupled to the input voltage, the charge-transfer circuit configured to transfer energy from the clamp capacitor to the input voltage.

15. An interleaved power converter comprising:
a first converter comprising a first resonant primary coupled to an input voltage, and the first converter defining a secondary side with an output voltage;
a second converter comprising a second resonant primary coupled to the input voltage, and the second converter defining a secondary side coupled to the output voltage;
a load-balancing circuit defining a first sense input coupled to the first resonant primary, and a second sense input coupled to the second resonant primary, the load-balancing circuit configured to limit a resonant voltage of the first resonant primary or the second resonant primary that, in operation of the interleaved power converter, has a higher peak-to-peak resonant voltage,
wherein the load-balancing circuit further comprises:
a first diode defining a cathode coupled to the first resonant primary, and an anode;
a second diode defining a cathode coupled to the second resonant primary, and an anode; and
a clamp capacitor having a first lead coupled the anodes, and a second lead coupled to a reference voltage.

16. The interleaved power converter of claim 15 further comprising a charge-transfer circuit comprising a charge output coupled to the cathodes, and a charge input, the charge-transfer circuit configured to transfer energy to the clamp capacitor.

17. The interleaved power converter of claim 12,
wherein the clamp capacitor is a first clamp capacitor;
wherein the interleaved power converter further comprising a trough clipping circuit comprising:
a third diode defining a cathode coupled to the first resonant primary, and an anode;
a fourth diode defining a cathode coupled to the second resonant primary, and an anode; and
a second clamp capacitor having a first lead coupled the anodes, and a second lead coupled to a reference voltage.

* * * * *